(12) United States Patent
Radke

(10) Patent No.: US 12,100,308 B2
(45) Date of Patent: Sep. 24, 2024

(54) GRAPHICAL USER INTERFACE WITH VISUAL REPRESENTATIONS OF MEASURES AS RHYTHM WHEELS FOR VISUAL, AUDITORY, AND KINESTHETIC LEARNING

(71) Applicant: Cameron Radke, San Diego, CA (US)

(72) Inventor: Cameron Radke, San Diego, CA (US)

( * ) Notice: Subject to any disclaimer, the term of this patent is extended or adjusted under 35 U.S.C. 154(b) by 0 days.

(21) Appl. No.: 18/408,415

(22) Filed: Jan. 9, 2024

(65) Prior Publication Data

US 2024/0242622 A1    Jul. 18, 2024

Related U.S. Application Data

(60) Provisional application No. 63/480,250, filed on Jan. 17, 2023.

(51) Int. Cl.
| | |
|---|---|
| *G09B 15/00* | (2006.01) |
| *A63F 13/814* | (2014.01) |
| *G06F 3/0481* | (2022.01) |
| *G10G 1/00* | (2006.01) |

(52) U.S. Cl.
CPC ............ *G09B 15/00* (2013.01); *A63F 13/814* (2014.09); *G06F 3/0481* (2013.01); *G10G 1/00* (2013.01)

(58) Field of Classification Search
CPC ..... G09B 15/00; A63F 13/814; G06F 3/0481; G10G 1/00
See application file for complete search history.

(56) References Cited

U.S. PATENT DOCUMENTS

| | | |
|---|---|---|
| 10,102,836 B2 | 10/2018 | Mintz et al. |
| 10,657,934 B1 | 5/2020 | Kolen et al. |
| 2008/0295674 A1 | 12/2008 | Rosario et al. |
| 2014/0352521 A1* | 12/2014 | Takahashi ............... G04F 5/025 84/484 |

(Continued)

FOREIGN PATENT DOCUMENTS

WO    2020163660 A2    8/2020

OTHER PUBLICATIONS

International Search Report and Written Opinion mailed May 1, 2024 in PCT/US2024/010942, 11 pages.

(Continued)

*Primary Examiner* — Robert W Horn
(74) *Attorney, Agent, or Firm* — PROCOPIO, CORY, HARGREAVES & SAVITCH LLP

(57) ABSTRACT

It is difficult to learn musical rhythm. Accordingly, a rhythm game is disclosed that translates the rhythm of each measure in a musical composition into a rhythm wheel that is visually represented in a graphical user interface. The rhythm wheel may be logically divided into one or more sections by a number of boundaries that is equal to the number of notes in the respective measure. Each boundary represents a note in the respective measure. The visual representation of the rhythm wheel may comprise a visual boundary for each boundary in the rhythm wheel. Each visual boundary may integrate a tolerance in the timing at which the respective note is to be performed. During gameplay, an indicator, representing tempo, may rotate around the visual representation, and a user may attempt to time an input to the indicator's traversal of each visual boundary.

20 Claims, 9 Drawing Sheets

(56) References Cited

U.S. PATENT DOCUMENTS

| | | |
|---|---|---|
| 2015/0094833 A1 | 4/2015 | Clements et al. |
| 2017/0018202 A1 | 1/2017 | Marradi et al. |
| 2022/0309946 A1 | 9/2022 | Scripp |

OTHER PUBLICATIONS

Fernando Benadon, "A Circular Plot for Rhythm Visualization and Analysis," MTO a journal of the Society for Music Theory, MTO 13.3 Examples: Benadon, https://www.mtosmt.org/issues/mto.07.13.3/benadon_examples.pdf, Sep. 2007Music Theory Online 13(3), 3 pages.

Willie Anku, "Circles and Time: A Theory of Structural Organization of Rhythm in African Music," MTO a journal of the Society for Music Theory, https://www.mtosmt.org/issues/mto.00.6.1/mto.00.6.1.anku.html, vol. 6, No. 1, Jan. 2000, 8 pages.

"Circular metronome | Chromatone.center," https://chromatone.center/practice/rhythm/circle/, retrieved Thu, Feb. 29, 2024 18:41:59 GMT, 5 pages.

John Varney, "A different way to visualize rhythm | TED Talk," https://www.ted.com/talks/john_varney_a_different_way_to_visualize_rhythm?language=en, retrieved Thu Feb. 29, 2024 21:31:57 pm, 3 pages.

Kyle VanHemert, "A Sweet App That Helps You Visualize Complex Rhythms | Wired," https://www.wired.com/2015/05/sweet-app-helps-visualize-complex-rhythms/, retrieved Thu Feb. 29, 2024 21:39:43 pm, 6 pages.

\* cited by examiner

FIG. 8A
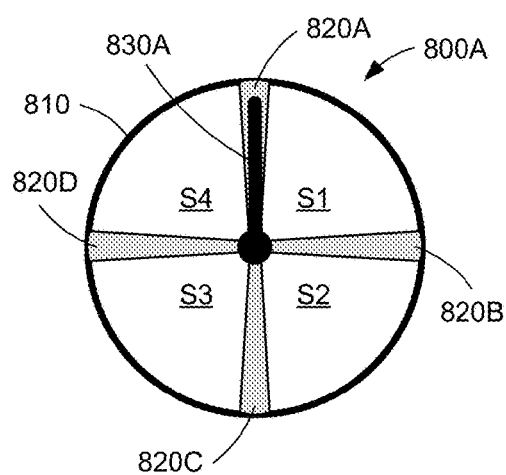
FIG. 8B
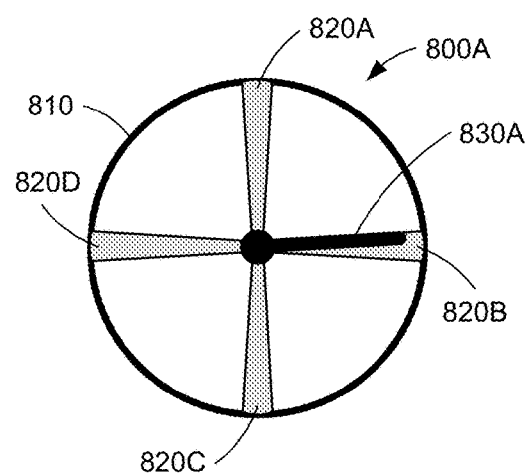
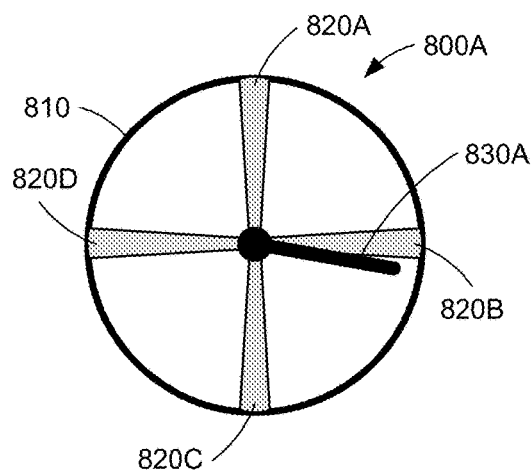
FIG. 8C

FIG. 9A
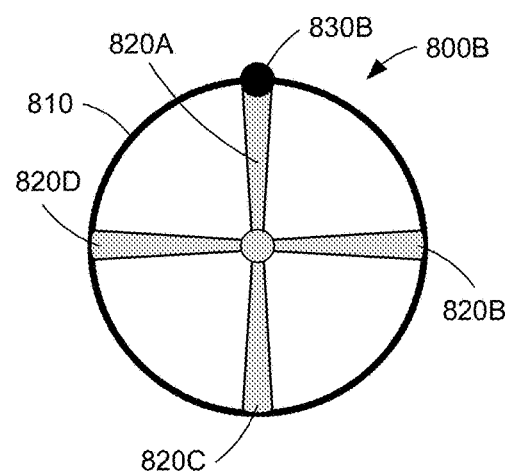
FIG. 9B
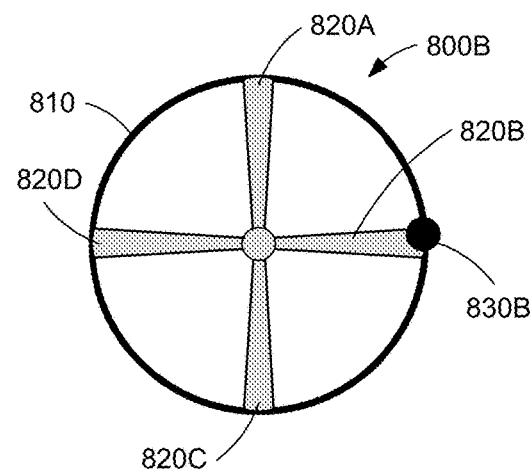
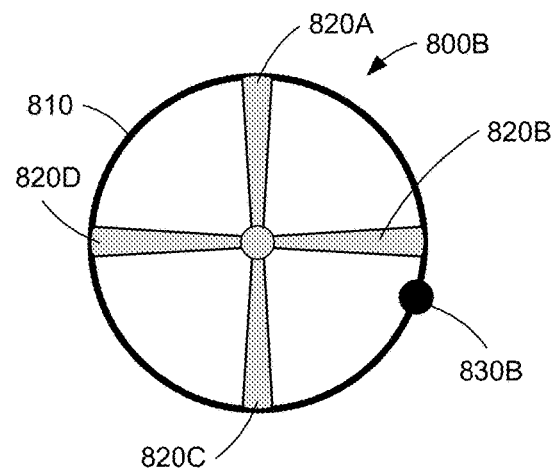
FIG. 9C

GRAPHICAL USER INTERFACE WITH VISUAL REPRESENTATIONS OF MEASURES AS RHYTHM WHEELS FOR VISUAL, AUDITORY, AND KINESTHETIC LEARNING

CROSS-REFERENCE TO RELATED APPLICATIONS

This application claims priority to U.S. Provisional Patent App. No. 63/480,250, filed on Jan. 17, 2023, which is hereby incorporated herein by reference as if set forth in full.

BACKGROUND

Field of the Invention

The embodiments described herein are generally directed to a graphical user interface, and, more particularly, to a graphical user interface with visual representations of measures as rhythm wheels for visual, auditory, and kinesthetic learning.

Description of the Related Art

It can be difficult to learn musical rhythm. It can be even more difficult to learn how to play a rhythm pattern with two parallel rhythms, using both hands simultaneously. Disclosed embodiments solve one or more problems with the state of the art, discovered by the inventor.

SUMMARY

Systems, methods, and non-transitory computer-readable media are disclosed for a graphical user interface with visual representations of measures as rhythm wheels for visual, auditory, and kinesthetic learning.

In an embodiment, a method comprises using at least one hardware processor to perform a process comprising: for each of one or more measures, in a musical composition, each of the one or more measures comprising a number of notes, loading a rhythm of that measure, and determining a rhythm wheel, corresponding to the measure, based on the rhythm, wherein the rhythm wheel is logically divided by one or more boundaries in a number of sections that is equal to the number of notes in the measure, and wherein each of the one or more boundaries is associated with a note in the measure; generating a graphical user interface that comprises a visual representation of each of the one or more rhythm wheels, wherein each visual representation comprises a shape and an indicator; and executing a gameplay by, until the gameplay is ended, updating the graphical user interface, such that, in the visual representation of each of the one or more rhythm wheels, the indicator moves around a center of the shape according to a tempo of the measure corresponding to that rhythm wheel, and for the visual representation of each of the one or more rhythm wheels, whenever an input is received in an input area of the graphical user interface that is associated with that visual representation, determining whether or not the input was received while the indicator of the visual representation was within a tolerance of a boundary, from among the one or more boundaries in that rhythm wheel, when the input was received while the indicator was within the tolerance of the boundary, apply a reward to a metric of performance, and when the input was received while the indicator was not within the tolerance of the boundary, apply a first penalty to the metric of performance, and whenever no input is received to the input area of the graphical user interface that is associated with the rhythm wheel during a time span over which the indicator entirely traverses the tolerance of a boundary, from among the one or more boundaries in that rhythm wheel, apply a second penalty to the metric of performance.

The shape of the visual representation of each of the one or more rhythm wheels may be a circle. The indicator may move around the center of the shape in a clockwise direction. The indicator may comprise a linear hand that rotates around the center of the shape. The indicator may comprise a marker that moves along a border of the shape.

The metric of performance may be a numerical score. Applying the reward to the metric of performance may comprise incrementing the numerical score, wherein applying the first penalty or second penalty to the metric of performance comprises decrementing the numerical score. The first penalty and the second penalty may be identical.

The one or more measures may comprise a first measure and a second measure that are to be performed in parallel, wherein the graphical user interface comprises a first visual representation of a first rhythm wheel determined for the first measure and a second visual representation of a second rhythm wheel determined for the second measure. The first measure may comprise a different number of notes than the second measure, wherein the first rhythm wheel is logically divided into a different number of sections than the second rhythm wheel. The first visual representation may be positioned in a left half of the graphical user interface, and the second visual representation may be positioned in a right half of the graphical user interface.

The visual representation of each of the one or more rhythm wheels may further comprise a visual boundary for each boundary of each section in that rhythm wheel. Each visual boundary may cover a region representing the tolerance of the respective boundary. The shape of the visual representation of each of the one or more rhythm wheels may be a circle, wherein each visual boundary is a sector of the circle.

The method may further comprise using the at least one hardware processor to perform the process for each of a sequence of a plurality of game levels, wherein the tolerance in a first one of the plurality of game levels, which is earlier in the sequence than a second one of the plurality of game levels, is greater than the tolerance in the second game level. The process may further comprise, when the input was received while the indicator was within the tolerance of the boundary, outputting audio playback of the note associated with that boundary. For each of the one or more rhythm wheels, the input area that is associated with the visual representation of that rhythm wheel may be separate from the visual representation of that rhythm wheel. The input area may comprise a visual representation of an instrument.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 8A-8C illustrate a visual representation of a rhythm wheel, according to a first embodiment;

FIGS. 9A-9C illustrate a visual representation of a rhythm wheel, according to a second embodiment;

DETAILED DESCRIPTION

In an embodiment, systems, methods, and non-transitory computer-readable media are disclosed for a graphical user interface with visual representations of measures as rhythm wheels for visual, auditory, and kinesthetic learning. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Infrastructure

Figure 1:
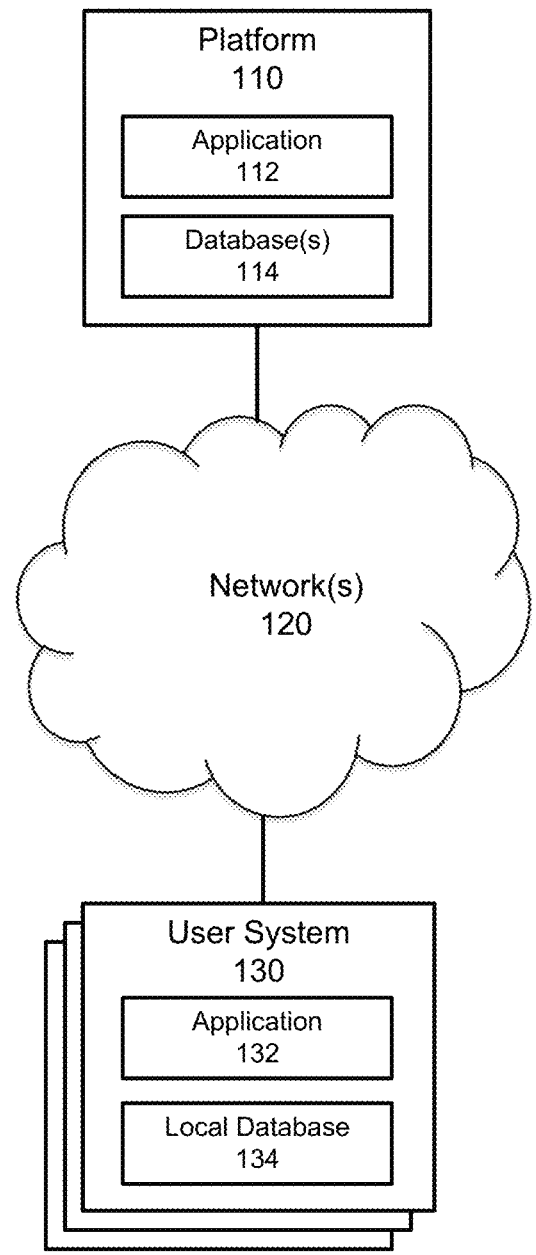
FIG. 1 illustrates an example infrastructure, in which one or more of the processes described herein may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various process(es) (e.g., functions implemented as software modules) described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130 via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks 120. For example, platform 110 may be connected to a subset of user systems 130 via the Internet, but may be connected to one or more other user systems 130 via an intranet. Furthermore, while only a few user systems 130, one server application 112, and one database 114 are illustrated, it should be understood that the infrastructure may comprise any number of user systems 130, server applications 112, and databases 114.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a typical user system 130 would be a smartphone, tablet computer, or laptop computer with a touch-sensor display. Each user system 130 may comprise or be communicatively connected to a client application 132 and/or one or more local databases 134.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database 114) that are locally and/or remotely accessible to platform 110. It should be understood that platform 110 may also respond to other types of requests from user system(s) 130 (e.g., requests for data unrelated to the graphical user interface).

As mentioned above, platform 110 may comprise, be communicatively coupled with, or otherwise have access to database 114. For example, platform 110 may comprise one or more database servers which manage one or more databases 114. Server application 112 executing on platform 110 and/or client application 132 executing on user system 130 may submit data (e.g., user data, form data, etc.) to be stored in database 114, and/or request access to data stored in database 114. Any suitable type of database may be utilized, including without limitation MySQL™, Oracle™, IBM™, Microsoft SQL™, Access™, PostgreSQL™, MongoDB™, and/or the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130, and provide responses in extensible Markup Language (XML), JavaScript Object Notation (JSON), and/or any other suitable or desired machine-readable format. In such embodiments, platform 110 may provide an application programming interface (API) which defines the manner in which user system(s) 130 may interact with the web service. Thus, client applications 132, executing on user system(s) 130, can define their own user interfaces, and rely on the web service to implement or otherwise provide the backend process(es), storage, and/or the like, described herein.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes described herein. For ease of description, this software will simply be referred to herein as a "rhythm game."

Although not a necessity, it is generally contemplated that the rhythm game would be a thick client application 132. In particular, user system 130 may download the rhythm game, as embodied in client application 132, from platform 110 or another system. In this case, the rhythm game may be an app that is downloaded, for example, from an online app store. As is well known in the art, an "app" is a software application designed to run on a mobile device, such as a smartphone, tablet computer, or the like. Client application 132 may generate and render the graphical user interface, as will be described elsewhere herein.

Client application 132 may communicate with server application 112 to support a user account associated with client application 132 and managed by server application 112. For instance, data of the user account (e.g., user profile, usage data, game progress, game scores, etc.) may be managed by server application 112 and stored in database 114. Server application 112 may receive new or updated user data from client application 132 and store the user data in database 114, and may send user data to client application 132 when requested by client application 132. This enables the user data to be accessed from any user system 130, provided that the correct credentials, associated with the respective user account, are used for authentication. In other words, the user account is not tethered to any particular user system 130. In an alternative or additional embodiment, client application 132 may be a stand-alone application that can be used without a user account and/or without server application 112. In this case, the user data may be stored locally by client application 132 in local database 134 on user system 130. In either case, client application 132 may be fully capable of operating without any connection to network(s) 120.

The rhythm game may be a single-player game, a multi-player game, or have both a single-player mode and a multi-player mode. In the case of a multi-player game or a multi-player mode, a plurality of users, with their own respective user accounts, may compete with each other, either synchronously and/or asynchronously.

When competing synchronously, a set of two or more users may play the same game level at the same time in a competition to achieve the highest metric of performance (e.g., score) for the game level, among the users in the competition. In this case, a reward (e.g., bonus score) may be provided to the user with the highest final metric of performance for the game level at the end of the competition. Synchronous competition may be performed by relaying data through server application 112. In particular, each user's respective client application 132 may continually send and retrieve data from server application 112, which maintains data related to all of the users' performances during the competition, in real time, to continually update the graphical user interface at each user system with the metric of performance and/or other data for each user in the competition. Alternatively, synchronous competition may be performed by direct communication (i.e., through network(s) 120, short-range wireless communications, or other communication means, without server application 112 acting as an intermediary) between the client applications 132 on the user systems 130 of the users in the competition.

When competing asynchronously, a set of two or more, including potentially all, users may play the rhythm game at any time, which may be the same time or different times, in a competition to achieve the highest metric of performance, among the set of users, per game level and/or for the overall rhythm game. In this case, server application 112 may maintain a leaderboard to show the metrics of performance for all users in the competition, per game level and/or for the overall game. A user may utilize the graphical user interface to navigate to and view the leaderboard for an individual game level and/or the overall rhythm game at any time, to compare their performance to other users' performances.

2. Example Processing System

Figure 2:
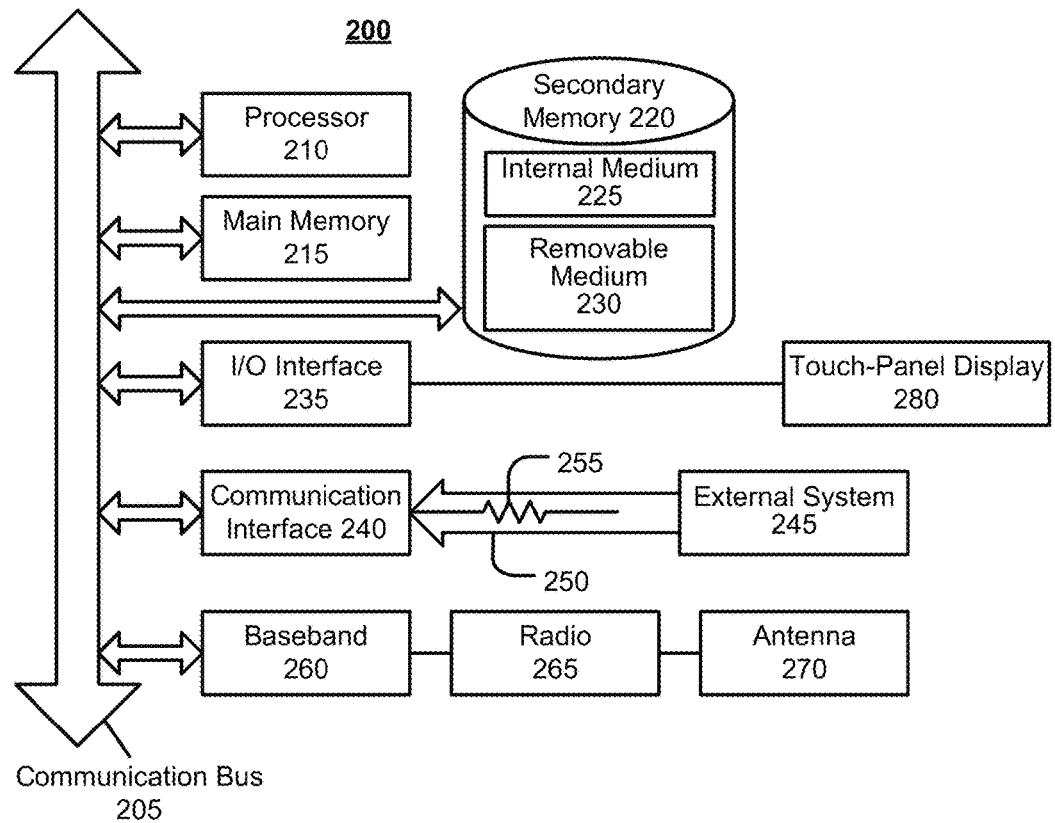
FIG. 2 illustrates an example processing system, by which one or more of the processes described herein may be executed, according to an embodiment.

FIG. 2 is a block diagram illustrating an example wired or wireless system 200 that may be used in connection with various embodiments described herein. For example, system 200 may be used as or in conjunction with one or more of the processes (e.g., to store and/or execute the software) described herein, and may represent components of platform 110, user system(s) 130, and/or other processing devices described herein. System 200 can be any processor-enabled device (e.g., server, personal computer, etc.) that is capable of wired or wireless data communication. Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 may comprise main memory 215. Main memory 215 provides storage of instructions and data for programs executing on processor 210, such as any of the software (e.g., rhythm game) discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display 280 (e.g., in a smartphone, tablet computer, or other mobile device).

In an embodiment in which system 200 is a user system 130, system 200 may comprise a touch-panel display 280, which may be connected to I/O interface 235. Touch-panel display 280 may comprise a display with a touch sensor that is coextensive or substantially coextensive with the display. A graphical user interface may be displayed on the display, with virtual inputs (e.g., buttons, toggles, textboxes, etc.) at positions, within the graphical user interface on the display, that are mapped to positions on the touch sensor. Thus, when contact is detected on the display by the touch sensor (e.g., touch by a finger, stylus, etc.), the position of that contact on the touch sensor can be mapped to a position of a virtual input within the graphical user interface on the display, to thereby determine a virtual input that has been selected by the user, and responsively activate the functionality associated with the selected virtual input.

System 200 may comprise a communication interface 240. Communication interface 240 allows software to be transferred between system 200 and external devices (e.g. printers), networks, or other information sources. For example, computer-executable code and/or data may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with network(s) 120 or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network 120, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, may enable system 200 to perform the various process(es) described elsewhere herein.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the process(es) described elsewhere herein.

System 200 may comprise wireless communication components that facilitate wireless communication over a voice network and/or a data network (e.g., in the case of user system 130). The wireless communication components may comprise an antenna system 270, a radio system 265, and a baseband system 260. In system 200, RF signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is communicatively coupled with processor(s) 210, which have access to memory 215 and 220. Thus, software can be received from baseband system 260 and stored in main memory 210 or in secondary memory 220, or executed upon receipt. Such software, when executed, can enable system 200 to perform the various process(es) described elsewhere herein.

3. Rhythm Wheel

Figure 3:
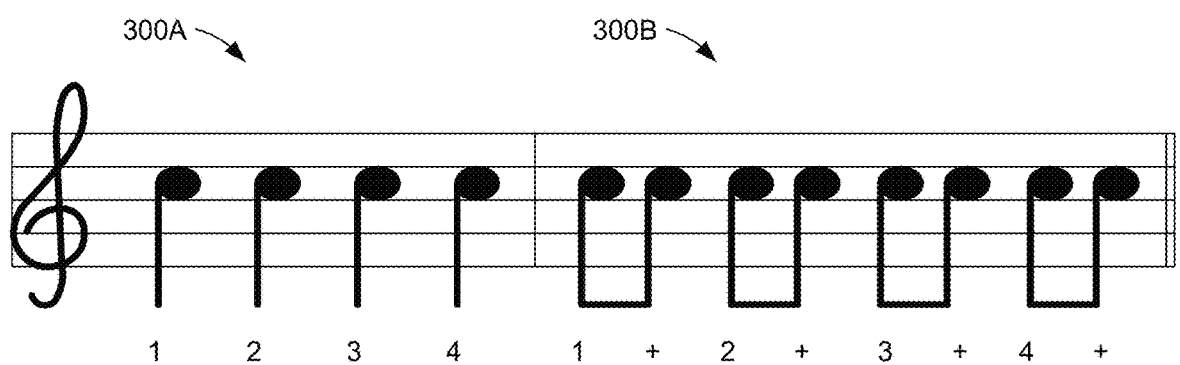
FIG. 3 illustrates two measures of a musical composition, according to an example.

FIG. 3 illustrates two measures 300 of a musical composition, according to an example. A "measure" is a segment of time within a musical composition that is defined by a number of temporal sections, called "beats." Most commonly, a measure of music is divided into four equal beats. The number of beats per minute (bpm) is known as the "tempo" or "speed" of the measure. For example, 60 bpm equals one beat per second. Measure 300A illustrates a common musical notation for four quarter notes, to be performed at four respective beats in measure 300A. Measure 300B illustrates a common musical notation for eight eighth notes, to be performed within four beats in measure 300B. The time durations of measures 300A and 300B are identical. However, measure 300B has twice as many notes within the same time frame as measure 300A.

As used herein, a reference numeral with an appended letter will be used to refer to a specific component, whereas the same reference numeral without any appended letter will be used to refer collectively to a plurality of the component or to refer to a generic or arbitrary instance of the component. Thus, for example, the term "measures 300" may refer collectively to any possible measure, including measures 300A and 300B, and the term "measure 300" may refer to any arbitrary measure, including measure 300A or 300B.

A musical composition may comprise any number of measures 300 and, in some cases, may comprise a plurality of parallel sets of one or more measures 300 that are to be performed in parallel with each other. As illustrated, traditional musical notation represents a measure of a musical composition as a linear sequence of notes, read from left to right. In an embodiment, in contrast to traditional musical notation, a measure of a musical composition is represented as a rhythm wheel. The rhythm wheel will primarily be described herein as a circle. However, it should be understood that the rhythm wheel may alternatively be adapted into other shapes, such as a non-circular ellipse, a triangle, a square, a pentagon, a hexagon, a heptagon, an octagon, a nonagon, a decagon, and/or the like, as well as an irregular curved and/or polygonal shape. In a preferred embodiment, the shape of the rhythm wheel is symmetrical across at least one axis. In any case, the term "wheel" should not be understood to imply that the rhythm wheel must be circular.

A circular rhythm wheel is the preferred embodiment, since a circle can be divided into any number of uniformly sized sections. A measure 300 can be transposed onto the rhythm wheel by defining a reference point on the border (e.g., circumference) of the rhythm wheel. The reference point represents the start of the measure 300 on the rhythm wheel. In an embodiment, the reference point is the topmost point on the border of the rhythm wheel. One loop (e.g., 360-degree loop) or other traversal around the rhythm wheel, from the reference point back to the reference point, represents a single measure 300. This traversal can be divided into one or more, preferably equally sized, sections, based on the number of notes in measure 300. For example, in the case of measure 300A, the rhythm wheel may be divided into four equal sections, whereas in the case of measure 300B, the rhythm wheel may be divided into eight equal sections. It should be understood that the rhythm wheel may be divided into any number of sections, so as to match the number of notes in the measure 300 represented by the rhythm wheel.

Figure 4A:
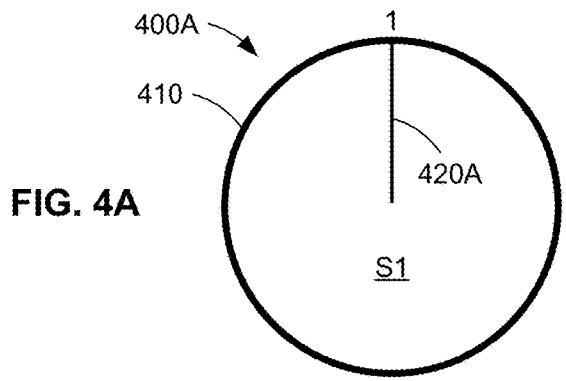
FIGS. 4A-4H illustrate rhythm wheels for measures having varying numbers of notes, according to embodiments.

FIG. 4A illustrates a rhythm wheel 400A for a measure 300 consisting of one note, according to an embodiment. As illustrated, rhythm wheel 400A is logically divided into one section by point 1, which represents one note in measure 300. It should be understood that, in this case, the division is not into a plurality of sections, but between a time leading up to the note being represented and a time following the note being represented.

Figure 4E:
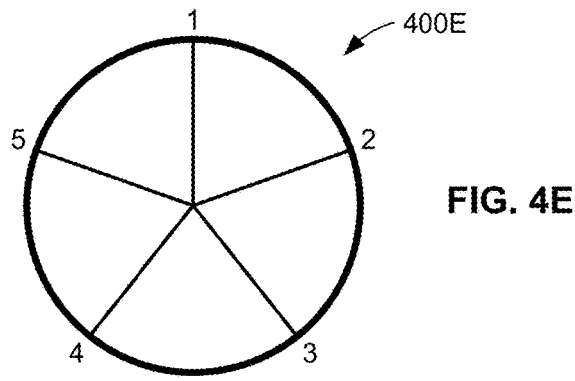
Figure 4B:
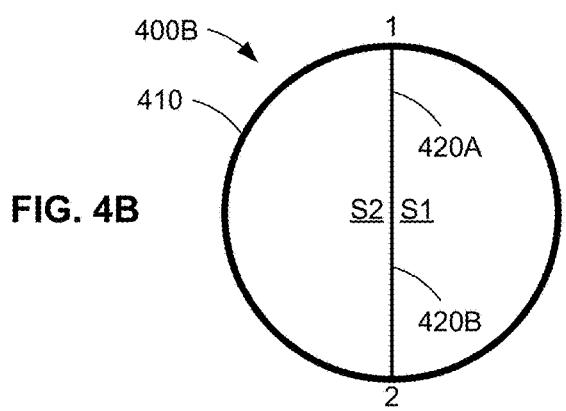

FIG. 4B illustrates a rhythm wheel 400B for a measure 300 consisting of two notes, according to an embodiment. As illustrated, rhythm wheel 400B is logically divided into two sections by points 1 and 2, which each represents one note in measure 300. Each of the points is separated by 180 degrees.

Figure 4F:
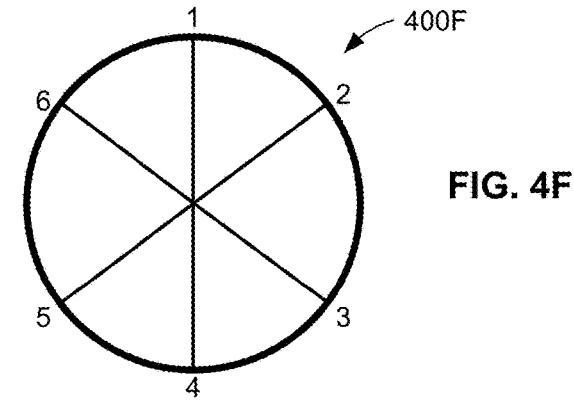
Figure 4C:
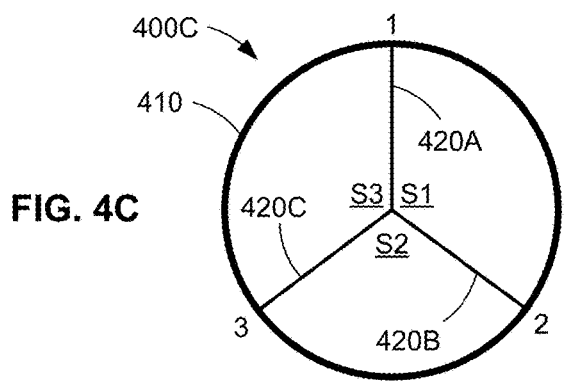

FIG. 4C illustrates a rhythm wheel 400C for a measure 300 consisting of three notes, according to an embodiment. As illustrated, rhythm wheel 400C is split into three sections by points 1, 2, and 3, which each represents one note in measure 300. Each of the points is separated by 120 degrees.

Figure 4G:
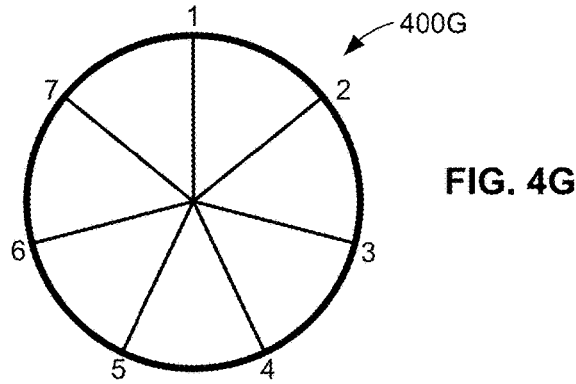
Figure 4D:
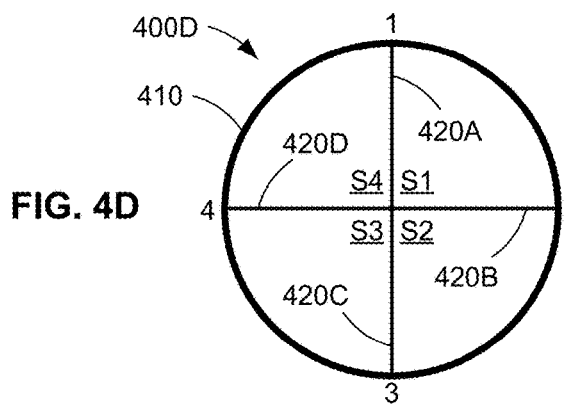

FIG. 4D illustrates a rhythm wheel 400D for a measure 300 consisting of four notes, according to an embodiment. As illustrated, rhythm wheel 400D is split into four sections by points 1, 2, 3, and 4, which each represents one note in measure 300. Each of the points is separated by 90 degrees.

FIG. 4E illustrates a rhythm wheel 400E for a measure 300 consisting of five notes, according to an embodiment. As illustrated, rhythm wheel 400E is split into five sections by points 1, 2, 3, 4, and 5, which each represents one note in measure 300. Each of the points is separated by 72 degrees.

FIG. 4F illustrates a rhythm wheel 400F for a measure 300 consisting of six notes, according to an embodiment. As illustrated, rhythm wheel 400F is split into six sections by points 1, 2, 3, 4, 5, and 6, which each represents one note in measure 300. Each of the points is separated by 60 degrees.

FIG. 4G illustrates a rhythm wheel 400G for a measure 300 consisting of seven notes, according to an embodiment. As illustrated, rhythm wheel 400G is split into seven sections by points 1, 2, 3, 4, 5, 6, and 7. Each of the points is separated by approximately 51.43 degrees.

Figure 4H:
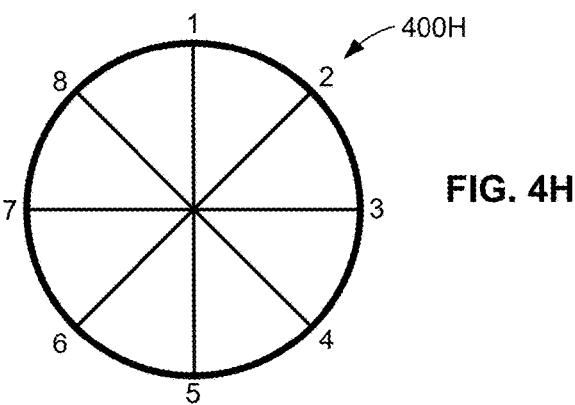

FIG. 4H illustrates a rhythm wheel 400H for a measure 300 consisting of eight notes, according to an embodiment. As illustrated, rhythm wheel 400H is split into eight sections by points 1, 2, 3, 4, 5, 6, 7, and 8, which each represents one note in measure 300. Each of the points is separated by 45 degrees.

Each rhythm wheel 400 comprises a shape 410. Shape 410 is preferably a circle. However, shape 410 could alternatively be a non-circular ellipse, a triangle, a square, a pentagon, a hexagon, a heptagon, an octagon, a nonagon, a decagon, and/or the like, as well as an irregular curved or polygonal shape. In a preferred embodiment, shape 410 is symmetrical across at least one axis.

Shape 410 is logically divided into one or more sections S by one or more boundaries 420. Each boundary 420 may extend radially from a center of shape 410 to the border of shape 410. The number of boundaries 420 is equal to the number of sections S into which shape 420 is divided. Using rhythm wheel 400A as an example, shape 410 is logically divided into one section S1 by one boundary 420A. Using rhythm wheel 400B as another example, shape 410 is logically divided into two sections S1 and S2 by two boundaries 420A and 420B. Using rhythm wheel 400C as another example, shape 410 is logically divided into three sections S1, S2, and S3, by three boundaries 420A, 420B, and 420C. Using rhythm wheel 400D as another example, shape 410 is logically divided into four sections S1, S2, S3, and S4, by four boundaries 420A, 420B, 420C, and 420D. It should be understood that rhythm wheels 400E-400H are each logically divided in a similar manner.

In all of the illustrated embodiments, each point is at the intersection between the border of shape 410 and a boundary 420. Each point represents one note in measure 300. For example, point 1 would represent the first note in measure 300, point 2 would represent the second note in measure 300, point 3 would represent the third note in measure 300, point 4 would represent the fourth note in measure 300, point 5 would represent the fifth note in measure 300, point 6 would represent the sixth note in measure 300, point 7 would represent the seventh note in measure 300, point 8 would represent the eighth note in measure 300, and so on and so forth. It should be understood that rhythm wheel 400 could be separated into any number of sections to represent any number of notes in a measure 300. For example, although not illustrated, rhythm wheel 400 could be logically divided into nine sections by nine points that are separated by 40 degrees, ten sections by ten points that are separated by 36 degrees, and so on and so forth. It should be understood that each point represents the timing at which to perform the corresponding note in the musical composition.

Regardless of the number of points, one traversal of rhythm wheel comprises movement from point 1 to point 2, and so on and so forth through all of the points in sequence and returning to point 1, to complete a full 360-degrees in the clockwise direction. For example, one traversal of rhythm wheel 400H starts with point 1, moves from point 1 to point 2, moves from point 2 to point 3, moves from point 3 to point 4, moves from point 4 to point 5, moves from point 5 to point 6, moves from point 6 to point 7, moves from point 7 to point 8, and moves from point 8 back to point 1 to begin the next traversal of rhythm wheel 400. Although the traversal of rhythm wheel 400 is described and illustrated herein as clockwise, in an alternative embodiment, the traversal of rhythm wheel 400 could be in the counterclockwise direction.

Figure 5A:
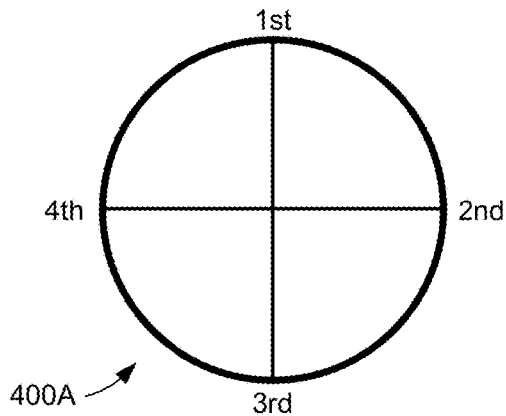
FIGS. 5A and 5B illustrate how notes may be assigned to points on a rhythm wheel, according to embodiments.

FIG. 5A illustrates how notes may be assigned to the points on rhythm wheel 400A for measure 300A with quarter notes, according to an embodiment. As illustrated, the first quarter note is assigned to point 1 at 0-degrees on rhythm wheel 400A, which is used as the reference point in the illustrated embodiments. Similarly, the second quarter note is assigned to the point 2 at 90-degrees on rhythm wheel 400A, the third quarter note is assigned to point 3 at 180-degrees on rhythm wheel 400A, and the fourth quarter note is assigned to point 4 at 270-degrees on rhythm wheel 400A. Accordingly, a single traversal of rhythm wheel 400A corresponds to a single performance of measure 300A, which should be performed such that the first quarter note is performed at point 1, the second quarter note is performed at point 2, the third quarter note is performed at point 3, and the fourth quarter note is performed at point 4. It should be understood that the time duration between each point, and therefore, the time duration between the performance of each note, is defined by the tempo. For example, if the tempo is 60 bpm, the time duration between each point, and the corresponding performance of each note, is one second.

Figure 5B:
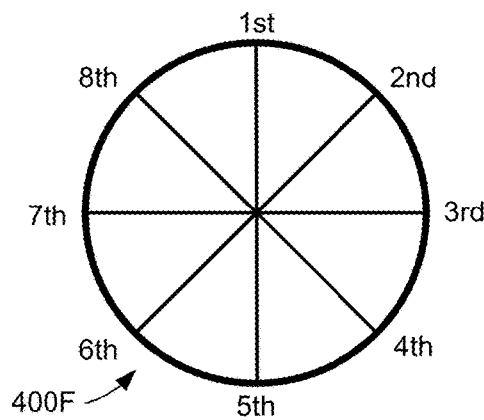

FIG. 5B illustrates how notes may be assigned to the points on rhythm wheel 400H for measure 300B with eighth notes, according to an embodiment. As illustrated, the first eighth note is assigned to point 1 at 0-degrees on rhythm wheel 400H, which is the reference point of rhythm wheel 400H. Similarly, the second eighth note is assigned to the point 2 at 45-degrees on rhythm wheel 400 H, the third eighth note is assigned to point 3 at 90-degrees on rhythm wheel 400H, the fourth eighth note is assigned to point 4 at 135-degrees on rhythm wheel 400H, the fifth eighth note is assigned to point 5 at 180-degrees on rhythm wheel 400H, the sixth eighth note is assigned to point 6 at 225-degrees on rhythm wheel 400H, the seventh eighth note is assigned to point 7 at 270-degrees on rhythm wheel 400H, and the eighth eighth note is assigned to point 8 at 315-degrees on rhythm wheel 400H. Accordingly, a single traversal of rhythm wheel 400F corresponds to a single performance of measure 300B, with should be performed such that the first eighth note is performed at point 1, the second eighth note is performed at point 2, the third eighth note is performed at point 3, the fourth eighth note is performed at point 4, the fifth eighth note is performed at point 5, the sixth eighth note is performed at point 6, the seventh eighth note is performed at point 7, and the eighth eighth note is performed at point 8. It should be understood that the time duration between each point and the performance of each note is defined by the tempo. Thus, using the example above, the time duration would be half a second.

Figure 6:
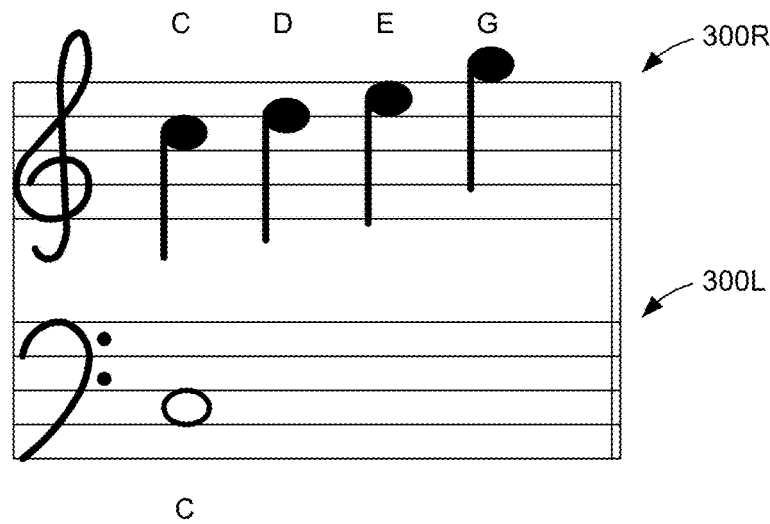
FIG. 6 illustrates two parallel measures of a musical composition, according to an example.

FIG. 6 illustrates two parallel measures 300 of a musical composition, according to an example. In this example, the rhythm comprises a first measure 300L and a second measure 300R that are to be performed in parallel (i.e., simultaneously), for example, using both hands. In particular, first measure 300L may be intended to be performed using the left hand, and second measure 300R may be intended to be performed using the right hand. In the illustrated example, first measure 300L consists of a single C-note, and second measure 300R consists of four quarter notes, and specifically, a C-quarter-note, D-quarter-note, E-quarter-note, and G-quarter-note. It should be understood that the actual notes are merely examples, and that measures 300L and 300R could comprise any different number of notes and any different types of notes than those illustrated.

Figure 7:
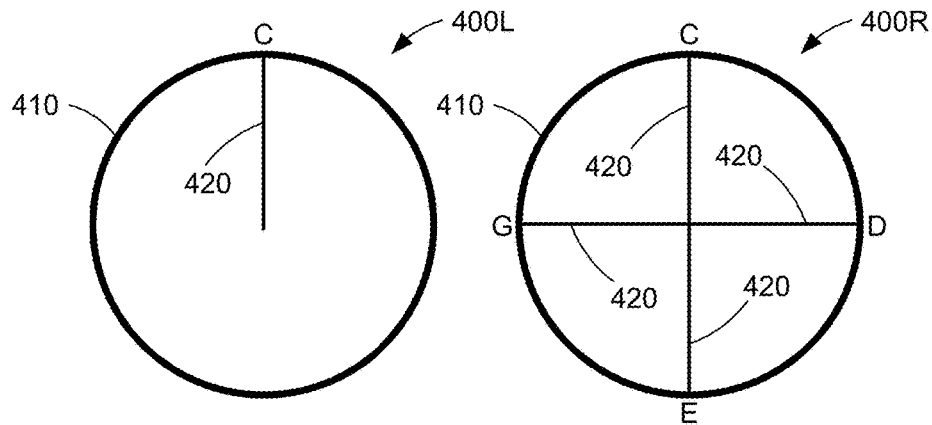
FIG. 7 illustrates two rhythm wheels for the two parallel measures in FIG. 6, according to an example.

FIG. 7 illustrates two rhythm wheels 400, determined for the two parallel measures 300L and 300R, according to an example. First rhythm wheel 400L comprise a single section with a single boundary 420 representing the timing at which to perform the single C-note. Second rhythm wheel 400R comprises four sections representing, from the reference point and moving clockwise, the C-quarter-note, D-quarter-note, E-quarter-note, and G-quarter note, which are each positioned at a boundary 420 representing the timing at which to perform the respective note. Notably, rhythm wheels 400L and 400R are both identical sizes, representing identical time durations. In other words, all four notes in second rhythm wheel 400R are to be performed over the same time duration as the single note in first rhythm wheel 400L. In particular, the four quarter notes in second rhythm wheel 400R will each last one beat (e.g., to be performed at the points at 0-degrees, 90-degrees, 180-degrees, and 270-degrees on rhythm wheel 400R), and the single note in first rhythm wheel 400L will last four beats (e.g., to be performed at the point at 0-degrees, with no performance at the points at 90-degrees, 180-degrees, and 270-degrees on rhythm wheel 400L).

In an embodiment, the note, to which each point on rhythm wheel 400 corresponds, could be indicated in a visual representation of rhythm wheel 400. For example, the letter of the note may be provided on or near the respective point. Alternatively, each point or each boundary 420 may be color-coded according to the respective note. For example, each note may be represented by a different color (e.g., C-note by green, D-note by blue, E-note by purple, G-note by orange, etc.). In either case, rhythm wheel 400 can be used to represent specific notes and melodies. Alternatively, the notes may not be represented at all in the visual representation of rhythm wheel 400. In this case, the user may simply focus on the timing of each note, without understanding the particular note that is to be performed at that timing.

4. Visual Representation of Rhythm Wheel

Rhythm wheel 400 has been illustrated herein in graphical form to facilitate an understanding of how each measure 300 in a musical composition may be translated into a visual element. In practice, each rhythm wheel 400 may be embodied in a data structure, stored in memory (e.g., main memory 215 and/or secondary memory 220), comprising one or more parameters that define shape 410, boundary(ies) 420, the positions of points along the border of shape 410, a tolerance of each boundary 420, a time duration for a traversal of rhythm wheel 400 and/or each section of rhythm wheel 400, and/or any other parameter related to rhythm wheel 400. A visual representation of each rhythm wheel 400 may be generated from this data structure, for use in the graphical user interface during gameplay.

FIGS. 8A-8C illustrate a visual representation 800A of rhythm wheel 400, according to a first embodiment. It should be understood that visual representation 800A will be divided into the same number of sections as the corresponding rhythm wheel 400. In the illustrated example, visual representation 800A is of rhythm wheel 400D, which has four notes, and therefore, four sections. Thus, visual representation 800A has four sections S1, S2, S3, and S4.

Visual representation 800 comprises a shape 810, which is the same shape 410 as rhythm wheel 400. In a preferred embodiment, shape 810 is a circle. However, as with rhythm wheel 400, visual representation 800 may be adapted into other shapes, such as a non-circular ellipse, a triangle, a square, a pentagon, a hexagon, a heptagon, an octagon, a nonagon, a decagon, and/or the like, as well as an irregular curved or polygonal shape. In a preferred embodiment, shape 810 of visual representation 800 is symmetrical across at least one axis.

Visual representation 800 of rhythm wheel 400 may comprise a visual boundary 820 for each boundary 420 in rhythm wheel 400. In the illustrated example, there are four visual boundaries 820A, 820B, 820C, and 820D, representing the four notes of rhythm wheel 400D. Like boundary 420, each visual boundary 820 divides visual representation 800 into one or more sections. However, unlike boundary 420, visual boundary 820 may cover a region representing a tolerance of the respective boundary 420. In particular, there may be a tolerance around each boundary 420. The tolerance represents the allowable imprecision or margin of error in the timing at which the note, represented by boundary 420, may be performed and still be considered on time during gameplay. In particular, the tolerance represents the amount of time by which a user's performance of the note is allowed to deviate from the true timing of the note.

In an embodiment, the amount of tolerance may depend on the game level. For example, as the game level increases, the amount of tolerance may decrease. Thus, the user must perform rhythms more precisely as the user progresses through the rhythm game. The size (e.g., circumferential width) of visual boundary 820 may correspond to the tolerance of the respective boundary 420. Thus, as the amount of tolerance for a boundary 420 decreases, the size of visual boundary 820 may proportionally decrease.

One traversal around rhythm wheel 400 represents the time duration of the corresponding measure 300. Thus, on rhythm wheel 400, the tolerance translates into a circumferential distance from boundary 420. Preferably, boundary 420 bisects the respective visual boundary 820, such that the size of visual boundary 820, and therefore, the amount of tolerance, is equal on each side of boundary 420 in terms of the direction of traversal. However, in an alternative embodiment, the tolerance could be on a single side of the respective boundary 420 (e.g., on the leading side in terms of the direction of traversal, or on the trailing side in terms of the direction of traversal).

In visual representation 800 of rhythm wheel 400, visual boundary 820 may represent the tolerance as a region of shape 810 extending from the center of shape 810 to the border of shape 810. For example, shape 810 may be a circle, and visual boundary 820 may be a sector of the circle. In an embodiment, in which there is equal tolerance on both sides of the respective boundary 420, visual boundary 820 will be centered on the respective boundary 420.

Visual representation 800A may comprise an indicator 830A. Indicator 830A moves around the center of shape 810. Preferably, indicator 830A moves around the center of shape 810 in a clockwise direction. However, in an alternative embodiment, indicator 830A may move around the center of shape 810 in a counter-clockwise direction. In either case, the movement of indicator 830 visually conveys the correct timing for performing notes in a measure 300 of a musical composition.

In the illustrated embodiment, indicator 830A comprises a linear hand that rotates around the center of shape 810 in a clockwise direction, similarly to a clock hand. Initially, in FIG. 8A, indicator 830A is positioned within visual boundary 820 at the reference point (e.g., with the linear hand along a radial axis between the center of shape 810 and the reference point). Then, as illustrated in FIGS. 8B and 8C, indicator 830A moves in a clockwise direction. If exactly one note is performed while indicator 830A is within a visual boundary 820, representing the tolerance of a boundary 420 of rhythm wheel 400, as illustrated in FIG. 8B, then the note was correctly performed. If more than one note is performed while indicator 830A traverses a visual boundary 820, then the note was incorrectly performed, since only a single note should be played per each traversal of a visual boundary 820. If no note is performed during a time span over which indicator 830A entirely traverses a visual boundary 820, then a note was missed. In addition, if any note is performed while indicator 830A is outside of a visual boundary 820, as illustrated in FIG. 8C, then the note was missed. It should be understood that indicator 830A may be considered to be outside a visual boundary 820 when any part of the linear hand, which would include the radially outer tip of the linear hand, is outside visual boundary 820.

FIGS. 9A-9C illustrate a visual representation 800B of rhythm wheel 400B, according to a second embodiment. Visual representation 800B is identical to visual representation 800A, except that visual representation 800B comprises an indicator 830B, instead of indicator 830A. Indicator 830B comprises a marker that moves along the border of shape 810, instead of a linear hand. The marker is illustrated as a dot (i.e., a filled circle), but could have other forms, such as an unfilled circle or another filled or unfilled shape (e.g., triangle, square, diamond, etc.), an icon, image, or the like. It should be understood that indicator 830B may move in the same manner as described with respect to indicator 830A, and that whether a note is correctly performed, incorrectly performed, or missed may be determined in the same manner as described with respect to indicator 830A. Indicator 830B may be considered to be outside a visual boundary 820 when any part of the marker is outside visual boundary 820 or when a center of the marker is outside visual boundary 820.

Regardless of the particular embodiment, indicator 830 will traverse shape 810 once for each measure 300 that is to be serially performed in the musical composition. Thus, if two measures 300 are to be performed serially, indicator 830 will traverse shape 810, from the reference point back to the reference point, two times. If three measures 300 are to be performed serially, indicator 830 will traverse shape 810 three times, and so on and so forth. The number of traversals may depend on the number of measures 300 in the musical composition, the design of the game level, whether or not the user quits the game prematurely, and/or the like.

In addition, indicator 830 will continue to traverse shape 810 once for each measure 300 that is to be performed, according to the proper tempo, even if a note is incorrectly performed or missed. In other words, gameplay does not stop for incorrectly performed or missed notes. However, audio and/or visual feedback may be provided to the user when notes are correctly performed, incorrectly performed, and/or missed.

5. Game Level

Figure 10:
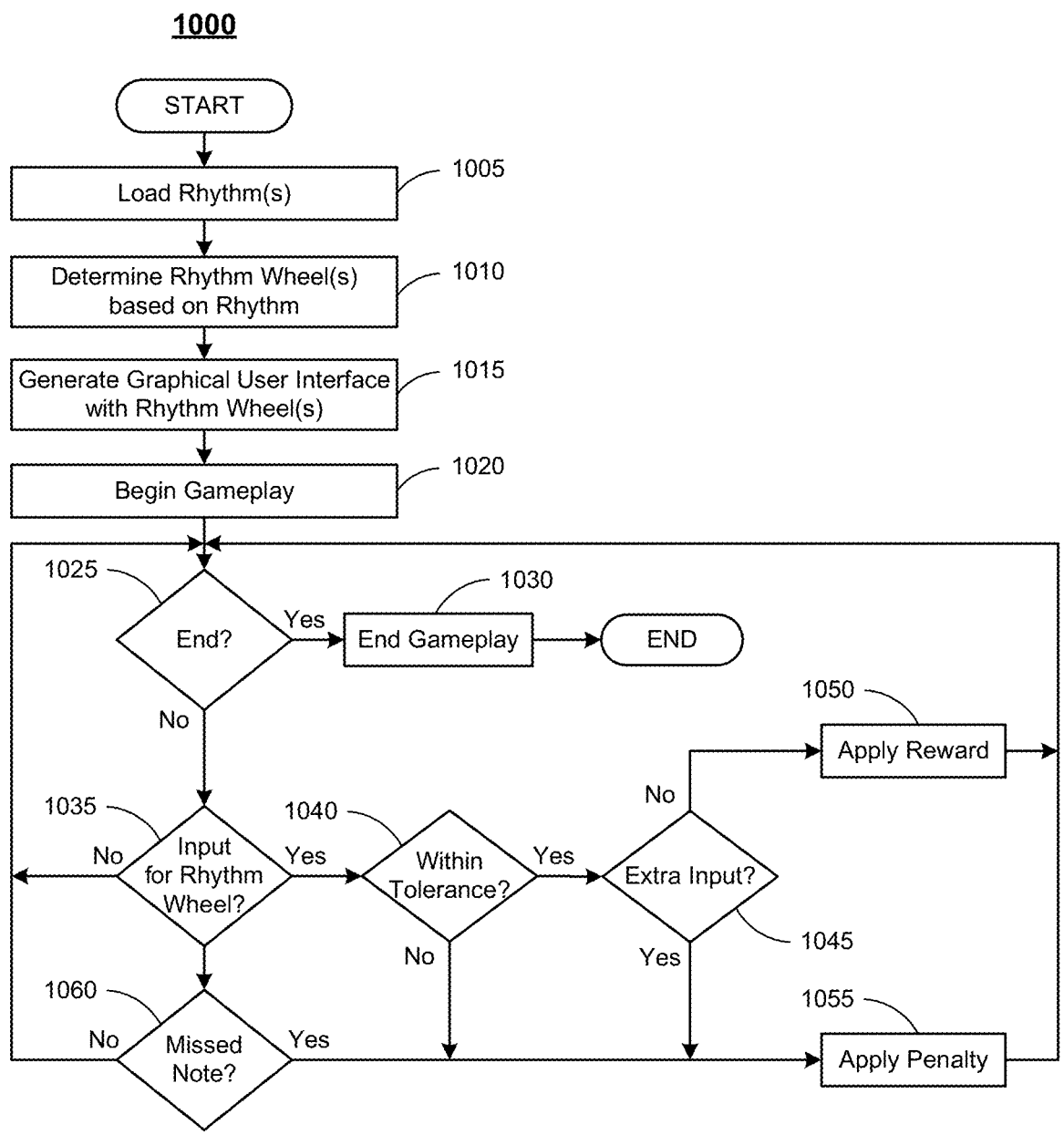
FIG. 10 illustrates a process for a single game level, according to an embodiment.

FIG. 10 illustrates a process 1000 for a single game level, according to an embodiment. Process 1000 is implemented in the rhythm game described throughout the present disclosure. While process 1000 is illustrated with a certain arrangement and ordering of subprocesses, process 1000 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 1000 may begin when a user initiates a new game level within the rhythm game. This action may be performed by the user through the graphical user interface of the rhythm game, for example, using touch-sensor display 280 of user system 130.

In subprocess 1005, a rhythm is loaded. For instance, one or more, and generally a plurality of, musical compositions may be stored in local database 134 of user system 130 or database 114 of platform 110. Each musical composition includes one or more measures 300, and each measure 300 comprises a number of note(s) to be played within a number beat(s), defined by the tempo, representing a rhythm of the measure 300. One of these plurality of musical compositions may be retrieved. For each of one or more measures 300 in the musical composition, a rhythm of that measure 300 may be loaded.

It should be understood that the musical composition could be, but may not necessarily be, a song. For instance, the musical composition could simply comprise one or more measures 300 of rhythm without any particular musical notes or consisting of the same musical note, in order to keep the user focused on rhythm. Alternatively, the musical composition could comprise different musical notes and with different rhythms to form a melody. Notably, in either case, the user may not have to know the correct note to be played. Rather, the focus of the rhythm game or a particular game level within the rhythm game may be solely on rhythm.

In subprocess 1010, for each of the one or more measures 300, a rhythm wheel 400, corresponding to that measure 300, may be determined based on the rhythm of that measure 300 that was loaded in subprocess 1005. Each rhythm wheel 400 may be logically divided into a number of sections by an equal number of boundaries 420 that is equal to the number of notes in that measure 300, as described elsewhere herein.

In an embodiment, the rhythm may comprise a first measure 300L and a second measure 300R that are to be performed in parallel (i.e., simultaneously), for example, using both hands. In this case, subprocess 1010 may comprise determining two rhythm wheels 400L and 400R that represent the two parallel measures 300L and 300R, respectively. It should be understood that the two parallel measures 300L and 300R could have a different number of notes. In this case, the respective rhythm wheels 400L and 400R would be logically divided into different numbers of sections. In particular, the first measure 300L may comprise a different number of notes than the second measure 300R, and a first rhythm wheel 400L, determined for the first measure 300L, may be logically divided into a different number of sections with a different number of boundaries 420 than a second rhythm wheel 400R, determined for the second measure 300R.

In subprocess 1015, a screen of the graphical user interface is generated that comprises a visual representation 800 of each rhythm wheel 400 that was determined in subprocess 1010. For example, for a musical composition without parallel measures 300, a single visual representation 800 may be generated from a single rhythm wheel 400, whereas, for a musical composition with two parallel measures 300, two visual representations 800 may be generated from two rhythm wheels 400 for the two parallel measures 300.

In subprocess 1020, the gameplay may begin. From subprocess 1020 onward, the gameplay is executed until the gameplay is ended. While the gameplay is executing, the graphical user interface is continually or continuously updated in real time, such that, in visual representation 800 of each rhythm wheel 400, indicator 830 moves around a center of shape 810 according to a tempo of measure 300 corresponding to rhythm wheel 400.

The objective of gameplay is for the user, during each traversal by indicator 830 through each visual boundary 820 of each visual representation 800 of each rhythm wheel 400, to perform exactly one input while indicator 830 is within visual boundary 820, and to not perform any inputs while indicator 830 is not within any visual boundary 820. As described elsewhere herein, each visual boundary 820 represents a tolerance of a boundary 420 of the respective rhythm wheel 400, and each boundary 420 represents a timing at which a note is to be performed in a measure 300 of the musical composition.

In subprocess 1025, it is determined whether or not to end gameplay. It may be determined to end gameplay once every measure 300 in the musical composition has been performed, the user quits the game via a user operation, and/or the like. When determining to end gameplay (i.e., "Yes" in subprocess 1025), process 1000 may proceed to subprocess 1030. When not determining to end gameplay (i.e., "No" in subprocess 1025), process 1000 may proceed to subprocess 1035.

In subprocess 1030, gameplay may be ended. When gameplay is ended, a final metric of performance, representing the overall quality of the user's performance during gameplay, may be displayed to the user in the graphical user interface. In addition, the final metric of performance may be stored in the user data associated with the user's user account and/or used to update the user's overall progress (e.g., game level) within the rhythm game. The graphical user interface may prompt the user, via one or more inputs, to replay the game level, play a next game level (if available), exit to a main menu of the rhythm game, and/or the like.

In subprocess 1035, it is determined whether or not there was an input for a visual representation 800 of a rhythm wheel 400. In particular, each visual representation 800 of a rhythm wheel 400 may be associated with an input area within the graphical user interface. Any user selection of that input area (e.g., contact to the input area by the user's finger or a stylus in an embodiment with touch-panel display 280, a click in the input area in an embodiment that uses a computer mouse or other input device, etc.) is an input in subprocess 1035. It should be understood that, in an embodiment in which the graphical user interface comprises two or more visual representations 800 of two or more rhythm wheels 400, there may be a separate and distinct input area of the graphical user interface associated with each visual representation 800. The input area may be the visual representation 800 itself or may be a region of the graphical user interface that is separate from the visual representation 800. In any case, whenever there is an input to the input area for a visual representation 800 of a rhythm wheel 400 (i.e., "Yes" in subprocess 1035), process 1000 proceeds to subprocess 1040. Otherwise, when there is no input for a visual representation of a rhythm wheel 400 (i.e., "No" in subprocess 1035), process 1000 proceeds to subprocess 1060.

While the input for a visual representation 800 of a rhythm wheel 400 is primarily described as the user selection of an input area, in an alternative embodiment, any other type of input may be used instead of or in addition to such an input. For example, the input could be an audible sound that the user makes, and which can be detected by a microphone of user system 130 (e.g., connected to I/O interface 235 of user system 130). As another example, the input could be a movement (e.g., hand gesture, head movement, eye movement, etc.) sensed by a camera or other sensor of user system 130 (e.g., connected to I/O interface 235 of user system 130).

In subprocess 1040, it is determined whether or not the input, received in subprocess 1035 for a visual representation 800 of rhythm wheel 400, was received while indicator 830 of visual representation 800 was within a tolerance of boundary 420 of that rhythm wheel 400. It should be understood that the tolerance of a boundary 420 represents an acceptable time duration within which to perform a note associated with that boundary 420. In particular, the location of indicator 830 for the respective visual representation 800 at the time at which the input was received is determined, and if the determined location of indicator 830 was within a visual boundary 820 when the input was received, the input was received within the tolerance. Otherwise, if the location of indicator 830 for the respective visual representation 800 was not within a visual boundary 820 when the input was received, the input was not received within the tolerance. When the input was received within the tolerance (i.e., "Yes" in subprocess 1040), process 1000 proceeds to subprocess 1045. Otherwise, when the input was received outside the tolerance (i.e., "No" in subprocess 1040), process 1000 proceeds to subprocess 1055.

In subprocess 1045, it is determined whether or not the input, received in subprocess 1035, while indicator 830 of visual representation 800 was within visual boundary 820, as determined in subprocess 1040, is the first input to be received during the current traversal of visual boundary 820. If the input is not the first input during the current traversal of visual boundary 820, then the input is an extra input. An extra input means that the user has incorrectly performed more than one note during a single traversal of visual boundary 820, for which only a single note should have been performed. When determining that the input is the first input during the current traversal of visual boundary 820, and therefore, is not an extra input (i.e., "No" in subprocess 1045), process 1000 proceeds to subprocess 1050. Otherwise, when determining that the input is not the first input to be received during the current traversal of visual boundary 820, and therefore, is an extra input (i.e., "Yes" in subprocess 1045), process 1000 proceeds to subprocess 1055.

In an embodiment, whenever an input is received in subprocess 1035, feedback may be provided. For example, the feedback may comprise audio feedback and/or visual feedback. In the event that the input is determined to correspond to a correctly performed note (i.e., "No" in subprocess 1045), the feedback may comprise audio playback of the note and/or positive visual feedback (e.g., text, color, image, animation, icon, etc., indicating that the note was performed correctly). The audio playback of the note may be a recorded or synthesized playback of the note by an instrument associated with the current game level. In the event that the input is determined to correspond to an incorrectly performed note (i.e., "No" in subprocess 1040 or "Yes" in subprocess 1045), the feedback may comprise audio playback of an error sound and/or negative visual feedback (e.g., text, color, image, animation, icon, etc., indicating that the note was performed incorrectly). In an alternative or additional embodiment, an audio playback of each note (e.g., recorded or synthesized playback of the note by an instrument associated with the current game level) may be automatically played at the correct timing for the note (e.g., while indicator 830 is in the center of the respective visual boundary 820) during gameplay.

In subprocess 1050, a reward is applied to a metric of performance being maintained for the current gameplay. The metric of performance may be a numerical score. In this case, applying the reward to the metric of performance may comprise incrementing the score by a first amount. The first amount may change dynamically based on the user's current performance of the musical composition. For example, the first amount may increase and/or a bonus amount may be added to the metric of performance whenever the user achieves a streak of successive correctly performed notes and/or correctly performed traversals of rhythm wheel 400. In addition, the first amount may depend on how close the user's input was to the true timing. For example, the closer the input is to the true timing, the higher the first amount may be. In this case, the tolerance may have a plurality of tiers, with each tier associated with a different percentage of the total tolerance and a different amount to be rewarded, and tiers representing a smaller percentage of the tolerance being associated with higher amounts. After applying the reward, process 1000 may return to subprocess 1025.

In subprocess 1055, a penalty may be applied to a metric of performance being maintained for the current gameplay. As mentioned above, the metric of performance may be a numerical score. In this case, applying the penalty to the metric of performance may comprise decrementing the score by a second amount, which may be equal to or different from the first amount by which the score is incremented. It should be understood that the second amount could be zero, such that the penalty is simply no increase to the score. Regardless, the metric of performance will generally increase as performance of the musical composition improves. After applying the penalty, process 1000 may return to subprocess 1025.

In subprocess 1060, it is determined whether no input was received, to the input area of the graphical user interface that was associated with a visual representation 800 of a rhythm wheel 400, during a time span over which indicator 830 entirely traversed a visual boundary 820, representing the tolerance of a boundary 420 of one of the sections of the rhythm wheel 400. If this is the case, then the user has missed a note. When determining that the user has missed a note (i.e., "Yes" in subprocess 1060), process 1000 proceeds to subprocess 1055 to apply a penalty. The penalty that is applied for a missed note may be identical to or different from the penalty that is applied for an extra input. When not determining that the user has missed a note (i.e., "No" in subprocess 1060), process 1000 may return to subprocess 1025.

In at least some game levels, the musical composition could consist of a single measure 300. In this case, the game may comprise performing a plurality of traversals (e.g., three, four, five, ten, fifteen, twenty, etc., traversals) of that single measure 300. Alternatively or additionally, in at least some game levels, the musical composition could consist of two parallel single measures 300L and 300R. In this case, the game may comprise performing a plurality of traversals (e.g., three, four, five, ten, fifteen, twenty, etc., traversals) of measures 300L and 300R in parallel.

However, it should also be understood that the musical composition could comprise a set of two or more successive measures 300 or two parallel sets of two or more successive measures 300. Each set of two or more successive measures 300 may comprise measures 300 with different rhythms, and therefore, different rhythm wheels 400. In this case, each visual representation 800 may be updated during the gameplay to reflect the rhythm wheel 400 for the current measure 300 to be performed, as the gameplay progresses successively through the set of two or more successive measures 300.

In an embodiment in which the musical composition comprises two parallel measures 300L and 300R, a first visual representation 800 of a rhythm wheel 400L for measure 300L and the respective input area may be positioned on one side (e.g., the left half) of the graphical user interface, and a second visual representation 800 of a rhythm wheel 400R for measure 400R and the respective input area may be positioned on the opposite side (e.g., the right half) of the graphical user interface. This enables the user to simultaneously perform the two parallel measures using both hands to contact the respective input areas. In this case, during gameplay, the graphical user interface may be updated one or more times to switch the positions of the first and second visual representations 800 and their respective input areas. Thus, the user must simultaneously perform measure 300L using the left hand and measure 300R using the right hand, and then simultaneously perform measure 300L using the right hand and measure 300R using the left hand. In other word, the user must perform both measures 300L and 300R using both hands. Over time, this will improve the user's coordination, including the user's ability to use both hands to simultaneously perform parallel rhythms.

As discussed elsewhere herein, a plurality of users may synchronously compete against each other in the same game level. In this case, each user may participate in an instance of process 1000 being executed by an instance of the rhythm game on the user's respective user system 130. Each user's progress during gameplay may be relayed through server application 112 and/or communicated directly between the respective user systems 130, such that the graphical user interface on each user's user system 130 is updated to reflect all of the participants' individual progress, including, for instance, each participant's metric of performance.

Alternatively or additionally, a plurality of users may synchronously compete against each other on the same user system 130. In this case, the graphical user interface may provide a region for each participant. In other words, each participant is associated with a different region of the graphical user interface. Each region may comprise an input area for each visual representation 800. Each participant can provide inputs to the input area(s) in their respective regions during gameplay, and process 1000 may track the individual metric of performance for each participant based on the inputs to their respective regions of the graphical user interface.

In either case, upon the end of gameplay in subprocess 1030, the winner of the competition may be selected as the participant with the highest metric of performance and/or using one or more other criteria. The graphical user interface on user system 130 may be updated to announce the winner, display a ranked list of the participants based on the participants' final metrics of performance, and/or the like.

In general, the described embodiments provide a framework for users to learn the concept of rhythm through a combination of visual, auditory, and kinesthetic learning. In particular, each visual representation 800 of rhythm circle 400 represents the correct timing of a rhythm to be performed. A user interacts with the graphical user interface to time their inputs, and in doing so, may improve the physical coordination of their hands or fingers, especially when playing parallel measures 300 using both hands.

6. Overall Rhythm Game

The rhythm game may have at least two goals. The first goal may be to teach the user how to perform rhythms, including improving the user's musical timing and coordination. The second goal may be to entertain the user. Other possible goals include, without limitation, teaching the user about musical composition, enabling the user to compete against and otherwise interact with other users, and/or the like.

The rhythm game may comprise a sequence of a plurality of game levels. Once a user successfully completes one game level, the user may be leveled up to the next game level in the sequence, such that the user progresses through the sequence of game levels, one at a time. Successful completion of a game level may be defined as the final metric of performance equaling or exceeding a predefined threshold, the correct performance of all notes with no missed notes, winning a competition against other users, and/or the like. Generally, as the game level increases, the difficulty or complexity of the rhythm may increase, the amount of tolerance may decrease, and/or the like. For example, process 1000 may be performed for each of a sequence of a plurality of game levels, and the tolerance in a first one of the plurality of game levels, which is earlier in the sequence than a second one of the plurality of game levels, may be greater than the tolerance in the second game level. Each game level may teach specific skills to the user, such that the user gains new skills as the user progresses through the sequence of game levels.

In an embodiment, the plurality of game levels may progress according to an overarching game story. For example, the user may play a character or "avatar" who uses virtual instruments to reunite an imaginary kingdom through the rediscovery of the joy of music. The user's avatar progresses through the story by completing game levels. One or more of the game levels may involve the user competing against animated characters or other users within the imaginary kingdom. The rhythm game may provide different visual settings for different game levels, in different screens of the graphical user interface, to ensure that the user remains visually engaged with the story. In addition, as the completes game levels, the user's avatar may evolve and/or options may be provided to the user for enhancing or otherwise changing the appearance of the user's avatar.

Figure 11:
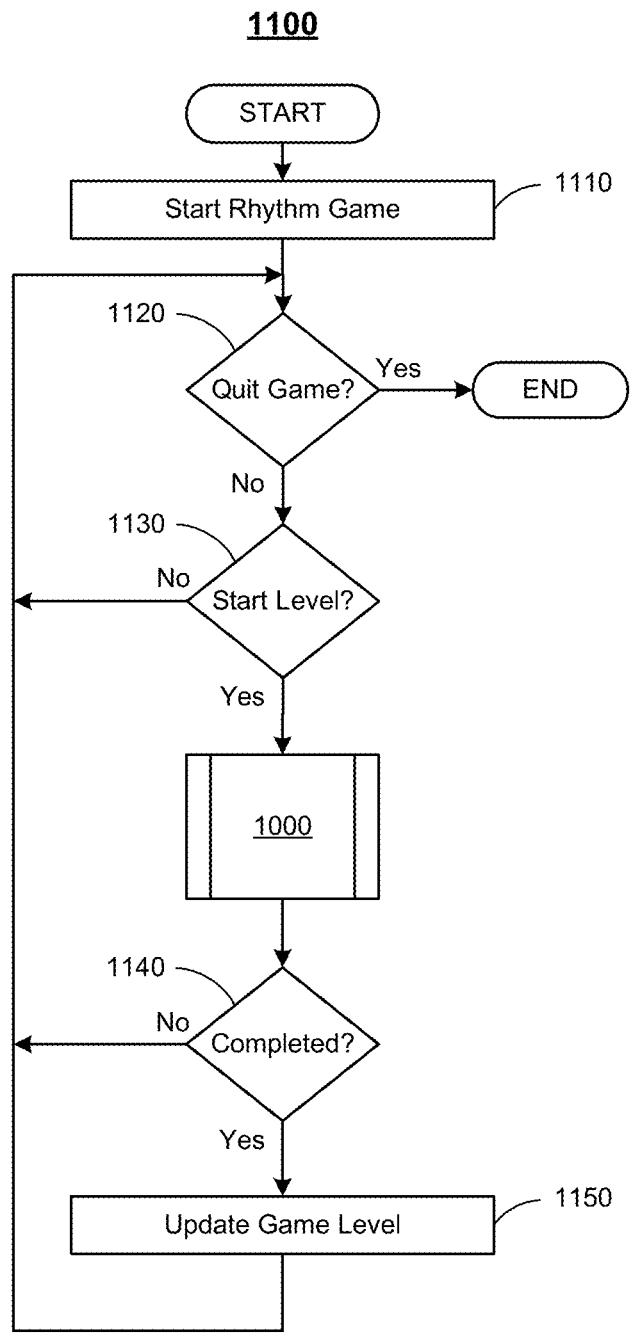
FIG. 11 illustrates a process for an overall rhythm game, according to an embodiment.

FIG. 11 illustrates a process 1100 for an overall rhythm game, according to an embodiment. While process 1100 is illustrated with a certain arrangement and ordering of subprocesses, process 1100 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 1110, the rhythm game is started. Subprocess 1110 may comprise the user initiating execution of the rhythm game. For example, in a client-based embodiment (e.g., app), the user may select an icon, associated with the rhythm game, from a menu of client applications 132 on user system 130, which may launch an instance of the rhythm game on user system 130. Alternatively, in a server-based embodiment, the user may log in to their user account with server application 112, which may launch an instance of the rhythm game for the user within the user's web browser.

In subprocess 1120, it is determined whether or not to quit the game. For example, it may be determined to quit the game when the user selects an input associated with terminating execution of the rhythm game in the graphical user interface. When determining to quit the game (i.e., "Yes" in subprocess 1120), process 1100 may end. Otherwise, when not determining to quit the game (i.e., "No" in subprocess 1120), process 1100 may proceed to subprocess 1130.

In subprocess 1130, it is determined whether or not to start a game level. For example, it may be determined to start a game level when the user selects an input associated with starting a game level in the graphical user interface. In an embodiment, the user may be able to select the next game level, in a sequence of game levels, that has yet to been completed by the user, and/or any game levels that have been previously completed by the user. When determining to start a game level (i.e., "Yes" in subprocess 1130), process 1100 may perform an iteration of process 1000. Otherwise, when not determining to start a game level (i.e., "No" in subprocess 1130), process 1100 may return to subprocess 1120.

After an iteration of subprocess 1000, in subprocess 1140, it may be determined whether or not the user successfully completed the game level that was started in subprocess 1130. As discussed elsewhere herein, the game level may be successfully completed when the final metric of performance equals or exceeds a predefined threshold, the user correctly performs all notes with no missed notes, and/or the like. When determining that the user successfully completed the game level (i.e., "Yes" in subprocess 1140), process 1100 may proceed to subprocess 1150. Otherwise, when determining that the user did not successfully perform the game level (i.e., "No" in subprocess 1140), process 1100 may return to subprocess 1120.

In subprocess 1150, the current game level may be updated. In particular, the user's current game level may be incremented to the next game level in the sequence of game levels. In this case, a new game level becomes available to the user. The user may start this new game level in a subsequent iteration of subprocess 1130. The user data, associated with the user's account, may be updated to reflect the completion of the game level and/or other change(s) in the user's progress, the metric of performance that was achieved for the game level, and/or the like.

Each game level in the sequence of game levels of the rhythm game may be associated with an instrument by which the corresponding musical composition is to be performed. Different game levels may be associated with different instruments. While any instrument can be used for the game levels, rhythmic instruments are generally preferable. Examples of rhythmic instruments include, without limitation, a drum, a shaker, a tambourine, a conga, a bongo, a djembe, or the like. Examples of suitable melodic instruments that could be used include, without limitation, a flute, a harp, a marimba, a piano, a guitar, a ukulele, or the like.

7. Example Graphical User Interface

Figure 12:
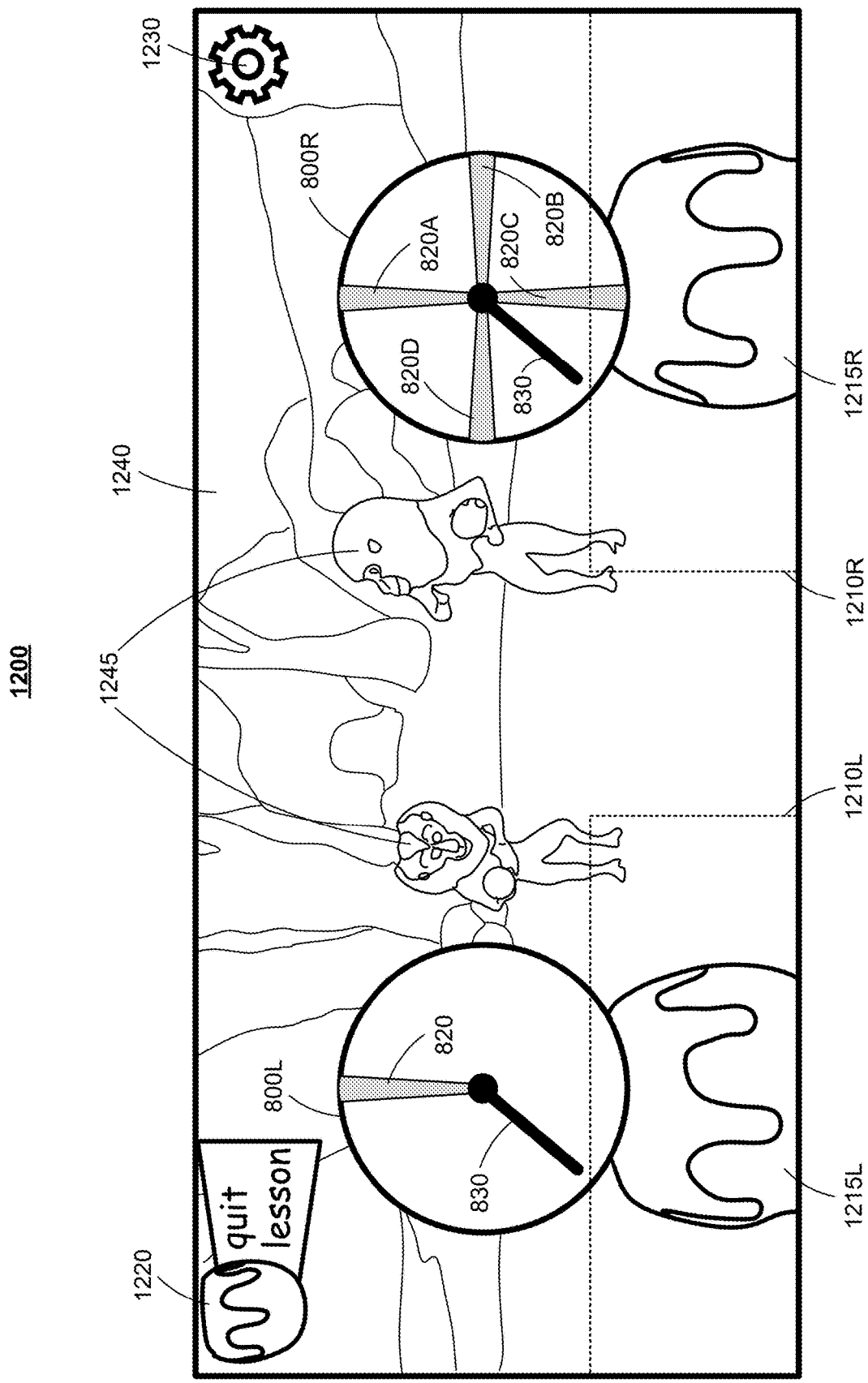
FIG. 12 illustrates an example of a screen of a graphical user interface of a rhythm game, according to an embodiment.

FIG. 12 illustrates an example of a screen 1200 of a graphical user interface of the rhythm game, according to an embodiment. It should be understood that screen 1200 is an example of the graphical user interface that may be generated in subprocess 1015 for a particular game level. Thus, screen 1200 may be displayed on a display (e.g., touch-panel display 280) of user system 130 during gameplay in process 1000.

In this example, the musical composition has two parallel measures 300. Therefore, screen 1200 comprises two visual representations 800L and 800R. Visual representation 800L is of a first rhythm wheel 400L determined for a first measure 300L, and visual representation 800R is of a second rhythm wheel 400R determined for a second measure 300R. First visual representation 800L is positioned in the left half of screen 1200, so as to be timed by the user's left hand, and visual representation 800R is positioned in the right half of screen 1200, so as to be timed by the user's right hand. Notably, since both measures 300L and 300R have the same tempo, indicator 830 will always be in the same location in both of visual representations 800L and 800R.

Screen 1200 comprises an input area 1210 for each visual representation 800. For example, input area 1210L is associated with visual representation 800L, and input area 1210R is associated with visual representation 800R. Thus, any input to input area 1210L will be measured against rhythm wheel 400L, and any input to input area 1210R will be measured against rhythm wheel 400R.

Each input area 1210 may comprise a visual representation 1215 of the instrument associated with the game level. For example, input area 1210L comprises a visual representation 1215L of an instrument being played by the left hand, and input area 1210R comprises a visual representation 1215R of an instrument being played by the right hand. In the illustrated embodiment, the instrument in both visual representation 1215L and visual representation 1215R is a drum. However, it should be understood that the instruments in input areas 1210L and 1210R could be different from each other, and/or could be any instrument other than a drum. It should be understood that, in an embodiment which provides audio feedback of the performed notes, the audio feedback may comprise an audio playback of the note by the instrument being represented in visual representation 1215.

Notably, the borders of input area(s) 1210 may not necessarily be visible. In this case, from the user's perspective, the user may simply select (e.g., tap in the case of a touch-panel display 280) visual representation 1215 of the instrument in each input area 1210 to perform a note. Preferably, input area 1210 encompasses all of visual representation 1215 and a vicinity around visual representation 1215, such that the user does not have to precisely contact visual representation 1215 of the instrument to perform a note.

Screen 1200 may comprise other inputs related to gameplay. For example, screen 1200 may comprise a quit input 1220. In response to the selection of quit input 1220 by the user (e.g., triggering "Yes" in subprocess 1025), the current game level may be ended immediately (e.g., in subprocess 1030), even if the current game level has not yet been completed. As another example, screen 1200 may comprise a settings input 1230. In response to the selection of settings input 1230 by the user, gameplay may be paused and a settings menu may be opened within the graphical user interface. The user may select one or more inputs in the settings menu to toggle or adjust settings related to gameplay (e.g., sound), see information about the rhythm game (e.g., version number), get help or tips (e.g., instructions on how to play), and/or the like.

Screen 1200 may comprise a background that provides a visual setting 1240 representing the role of the current game level in the overarching game story of the rhythm game. For example, visual setting 1240 may comprise or consist of a landscape within an imaginary kingdom that is being visited by the user's avatar in the current game level.

Visual setting 1240 may include one or more other characters 1245. In a single-player game or mode, character(s) 1245 may be non-player characters (NPCs). In a multi-player game or mode, character(s) 1245 may include non-player characters and/or the avatars of other users. For example, visual setting 1240 may include the avatar of each participating user in a multi-player competition, except for the avatar of the current user (i.e., assuming that a first-person perspective is used). In this case, it should be understood that visual setting 1240 of each participating user may be the same, but that each participating user's perspective within that visual setting 1240 will differ.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to perform a process comprising:
   for each of one or more measures, in a musical composition, each of the one or more measures comprising a number of notes,
   loading a rhythm of that measure, and
   determining a rhythm wheel, corresponding to the measure, based on the rhythm, wherein the rhythm wheel is logically divided by one or more boundaries into a number of sections that is equal to the number of notes in the measure, and wherein each of the one or more boundaries is associated with a note in the measure;
   generating a graphical user interface that comprises a visual representation of each of the one or more rhythm wheels, wherein each visual representation comprises a shape and an indicator; and
   executing a gameplay by, until the gameplay is ended, updating the graphical user interface, such that, in the visual representation of each of the one or more rhythm wheels, the indicator moves around a center of the shape according to a tempo of the measure corresponding to that rhythm wheel, and
   for the visual representation of each of the one or more rhythm wheels,
   whenever an input is received in an input area of the graphical user interface that is associated with that visual representation,
   determining whether or not the input was received while the indicator of the visual representation was within a tolerance of a boundary, from among the one or more boundaries in that rhythm wheel,
   when the input was received while the indicator was within the tolerance of the boundary, apply a reward to a metric of performance, and
   when the input was received while the indicator was not within the tolerance of the boundary, apply a first penalty to the metric of performance, and
   whenever no input is received to the input area of the graphical user interface that is associated with the rhythm wheel during a time span over which the indicator entirely traverses the tolerance of a boundary, from among the one or more boundaries in that rhythm wheel, apply a second penalty to the metric of performance.

2. The method of claim 1, wherein the shape of the visual representation of each of the one or more rhythm wheels is a circle.

3. The method of claim 1, wherein the indicator moves around the center of the shape in a clockwise direction.

4. The method of claim 1, wherein the indicator comprises a linear hand that rotates around the center of the shape.

5. The method of claim 1, wherein the indicator comprises a marker that moves along a border of the shape.

6. The method of claim 1, wherein the metric of performance is a numerical score.

7. The method of claim 6, wherein applying the reward to the metric of performance comprises incrementing the numerical score, and wherein applying the first penalty or second penalty to the metric of performance comprises decrementing the numerical score.

8. The method of claim 1, wherein the first penalty and the second penalty are identical.

9. The method of claim 1, wherein the one or more measures comprise a first measure and a second measure that are to be performed in parallel, and wherein the graphical user interface comprises a first visual representation of a first rhythm wheel determined for the first measure and a second visual representation of a second rhythm wheel determined for the second measure.

10. The method of claim 9, wherein the first measure comprises a different number of notes than the second measure, and wherein the first rhythm wheel is logically divided into a different number of sections than the second rhythm wheel.

11. The method of claim 9, wherein the first visual representation is positioned in a left half of the graphical user interface, and the second visual representation is positioned in a right half of the graphical user interface.

12. The method of claim 1, wherein the visual representation of each of the one or more rhythm wheels further comprises a visual boundary for each boundary of each section in that rhythm wheel.

13. The method of claim 11, wherein each visual boundary covers a region representing the tolerance of the respective boundary.

14. The method of claim 13, wherein the shape of the visual representation of each of the one or more rhythm wheels is a circle, and wherein each visual boundary is a sector of the circle.

15. The method of claim 1, further comprising using the at least one hardware processor to perform the process for each of a sequence of a plurality of game levels, wherein the tolerance in a first one of the plurality of game levels, which is earlier in the sequence than a second one of the plurality of game levels, is greater than the tolerance in the second game level.

16. The method of claim 1, wherein the process further comprises, when the input was received while the indicator was within the tolerance of the boundary, outputting audio playback of the note associated with that boundary.

17. The method of claim 1, wherein, for each of the one or more rhythm wheels, the input area that is associated with the visual representation of that rhythm wheel is separate from the visual representation of that rhythm wheel.

18. The method of claim 16, wherein the input area comprises a visual representation of an instrument.

19. A system comprising:
at least one hardware processor; and
one or more software modules that are configured to, when executed by the at least one hardware processor, perform a process comprising
for each of one or more measures, in a musical composition, each of the one or more measures comprising a number of notes,
loading a rhythm of that measure, and
determining a rhythm wheel, corresponding to the measure, based on the rhythm, wherein the rhythm wheel is logically divided by one or more boundaries into a number of sections that is equal to the number of notes in the measure, and wherein each of the one or more boundaries is associated with a note in the measure,
generating a graphical user interface that comprises a visual representation of each of the one or more rhythm wheels, wherein each visual representation comprises a shape and an indicator, and
executing a gameplay by, until the gameplay is ended,
updating the graphical user interface, such that, in the visual representation of each of the one or more rhythm wheels, the indicator moves around a center of the shape according to a tempo of the measure corresponding to that rhythm wheel, and
for the visual representation of each of the one or more rhythm wheels,
whenever an input is received in an input area of the graphical user interface that is associated with that visual representation,
determining whether or not the input was received while the indicator of the visual representation was within a tolerance of a boundary, from among the one or more boundaries in that rhythm wheel,
when the input was received while the indicator was within the tolerance of the boundary, apply a reward to a metric of performance, and
when the input was received while the indicator was not within the tolerance of the boundary, apply a first penalty to the metric of performance, and
whenever no input is received to the input area of the graphical user interface that is associated with the rhythm wheel during a time span over which the indicator entirely traverses the tolerance of a boundary, from among the one or more boundaries in that rhythm wheel, apply a second penalty to the metric of performance.

20. A non-transitory computer-readable medium having instructions stored therein, wherein the instructions, when executed by a processor, cause the processor to perform a process comprising:
for each of one or more measures, in a musical composition, each of the one or more measures comprising a number of notes,
loading a rhythm of that measure, and
determining a rhythm wheel, corresponding to the measure, based on the rhythm, wherein the rhythm wheel is logically divided by one or more boundaries into a number of sections that is equal to the number of notes in the measure, and wherein each of the one or more boundaries is associated with a note in the measure;
generating a graphical user interface that comprises a visual representation of each of the one or more rhythm wheels, wherein each visual representation comprises a shape and an indicator; and
executing a gameplay by, until the gameplay is ended,
updating the graphical user interface, such that, in the visual representation of each of the one or more rhythm wheels, the indicator moves around a center of the shape according to a tempo of the measure corresponding to that rhythm wheel, and
for the visual representation of each of the one or more rhythm wheels,
whenever an input is received in an input area of the graphical user interface that is associated with that visual representation,
determining whether or not the input was received while the indicator of the visual representation was within a tolerance of a boundary, from among the one or more boundaries in that rhythm wheel,
when the input was received while the indicator was within the tolerance of the boundary, apply a reward to a metric of performance, and
when the input was received while the indicator was not within the tolerance of the boundary, apply a first penalty to the metric of performance, and
whenever no input is received to the input area of the graphical user interface that is associated with the rhythm wheel during a time span over which the indicator entirely traverses the tolerance of a boundary, from among the one or more boundaries in that rhythm wheel, apply a second penalty to the metric of performance.

* * * * *